Figure 1:
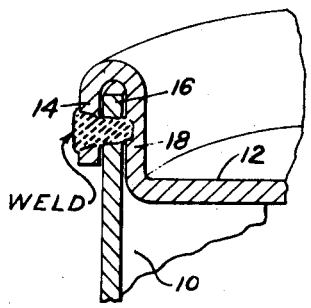

Aug. 1, 1944.  A. W. McCLARY  2,354,921
METAL DRUM
Filed May 31, 1941

INVENTOR.
ARCHIE W. McCLARY.
BY Charles O. Bruce
ATTORNEY.

Patented Aug. 1, 1944

2,354,921

UNITED STATES PATENT OFFICE 2,354,921

METAL DRUM

Archie W. McClary, Oakland, Calif.

Application May 31, 1941, Serial No. 396,015

2 Claims. (Cl. 113—121)

My invention relates to metal drums, and more particularly to a novel and improved chime seam for such drum and the method of forming the same.

Among the objects of my invention are—

(1) To provide a novel and improved drum of light weight, capable of withstanding internal pressures, for which heavier drums were previously constructed;

(2) To provide a novel and improved metal drum which lends itself to the application of standard machinery in the manufacture thereof;

(3) To provide a novel and improved chime seam of light gauge material in a metal drum, which seam shall be capable of withstanding all the strains and stresses of normal use, thereby enabling the manufacture of the drum from lighter gauge material than was previously customary in the prior art;

(4) To provide a novel and improved seam which is absolutely leak-proof against vapor as well as liquids;

(5) To provide a novel and improved seam formed from light gauge material and reinforced in the process of forming;

(6) To provide a novel and improved seam embodying a multiple seal;

(7) To provide a novel and improved method of forming a chime seam of a metal drum.

Additional objects of my invention will be brought out in the following description of the same taken in conjunction with the accompanying drawing wherein—

Figures 1 to 7 inclusive, are views in section through various embodiments of my invention.

My invention in general involves a particular application of welding as a step in the formation of a chime seam, leading to the economical production of drums of lighter gauge metal, without sacrificing any of the attributes desired in a drum, and particularly a drum designed for the handling of highly volatile and explosive liquids such as gasoline, naphtha or the like.

The application of certain specific forms of welding in the manufacture of drums is not broadly new. Resistance welding has been attempted, but inasmuch as resistance welding is only applicable to a pair of originally separable or unconnected layers of material, its use is thus highly restricted as to the type or formation of seam in a drum.

Metallic welding, which involves the application of an arc flame or gas flame, and usually accompanied by the addition of metal from a weld rod, has also been employed. In every case of this nature, with which I am familiar, the user has followed the conventional practice of welding between exposed edges of adjacent walls, or between an exposed edge of one wall and an exposed surface of another wall, the added metal serving to bridge the exposed gap previously existing between the two.

I have found that I can employ metallic welding in a radically new manner in the formation of a drum chime seam; and that is by welding, not between exposed parts of different walls, but through the walls themselves, thereby joining unexposed or hidden walls and unexposed or hidden wall surfaces to an outer wall of the seam, the addition of metal aiding in the formation of a solid and substantial connection through two or more or even all of the walls of the seam, whereby the seam is not only reinforced, but, where one or more unexposed or hidden walls are welded completely through, successive seals are formed.

The type of seam to which my invention is applicable is practically unlimited, and various modes of practicing the invention as applied to two different types of seams are depicted in the drawing to which reference will now be made.

Figure 2:
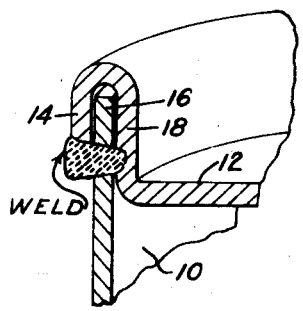
Figure 3:
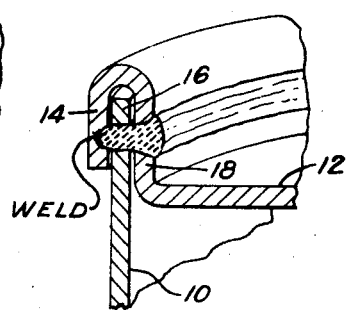

In Figures 1, 2 and 3, the seam is similar and of the type formed by enclosing the peripheral rim of the wall sheet 10 within a peripheral fold of the head sheet 12, thereby producing a seam structure of three substantially parallel walls 14, 16 and 18, of which the two outer walls 14 and 18 are part of the head sheet and therefore interconnected, and the intermediate wall forming part of the wall sheet, is unexposed or hidden. To obtain the finished seam of Figure 1, I weld through an intermediate portion of both the outer wall 14 and hidden wall 16, and into the other outer wall 18, adding metal to the weld as the operation progresses.

The seam of Figure 2 is obtained by welding through a lower region of the outer wall 14 to include the exposed edge of said wall and bury the same in the finished weld by the added metal.

In Figure 3, the direction of welding has been reversed from what it was in the formation of the seam of Figure 1. In lieu of welding inwardly through the outer wall 14, the direction of welding is outwardly starting with the wall 18 and terminating in the wall 14.

Figures 4 to 7 inclusive, deal with a crimped seam of a plurality of folds, and is of a type customarily employed in the forming of a cemented type seam, wherein sealing cement is placed between the various folds during crimping. However, no cement is utilized in the present instance, as the same is not only unnecessary, but would preclude any successful attempt at producing a weld. A seam of the character disclosed involves five substantially parallel walls 20, 22, 24, 26 and 28, respectively. Of these, the wall 20 is interconnected with both walls 24 and 28, wall 22 is interconnected with wall 26, and walls 22, 24 and 26 are unexposed or hidden within the seam structure.

Figure 4:
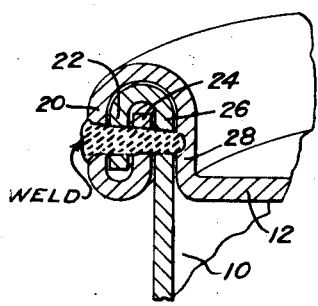
Figure 5:
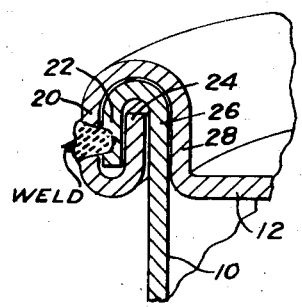

In completing the seam of Figure 4, I weld through an intermediate portion of the outer wall 20 and proceed inwardly through all the unexposed or hidden walls, and terminate the weld in the outer wall 28. As in previous instances, weld metal is added. To obtain a satisfactory seam, however, it is not essential to weld through all the unexposed or hidden walls of the seam as in Figure 4, but the weld may be terminated in any of the unexposed walls. One example is illustrated in Figure 5 where the weld is shown terminating in the unexposed wall 22.

Figure 6:
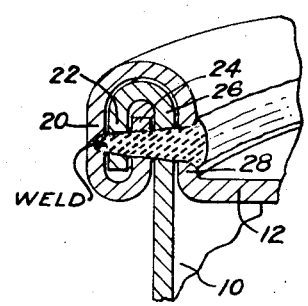

The embodiment of Figure 6 illustrates a seam corresponding to that of Figure 4, except in that the direction of welding is reversed. Thus, the weld which starts through the outer wall 28 of the seam, extends through all the unexposed or hidden walls and terminates in the outer wall 20 of the seam.

Figure 7:
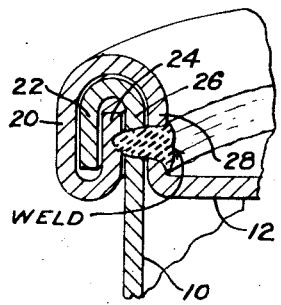

In the embodiment of Figure 7, the same direction of welding is followed as in Figure 6, but the weld is terminated in one of the unexposed walls, namely the wall 24 in the example illustrated, instead of extending through all the unexposed or hidden walls and terminating in an outer wall.

All seams formed in accordance with the method described, inherently become rigidified and strengthened, because, by welding through the walls, a solid cross-sectional portion results which ties the walls together in an integral metallic bond, and the metal added during welding serves to increase such cross-sectional portion and contribute added reinforcement to the seam, both inwardly of the seam and about an outer wall thereof.

It is of considerable importance, also, to note that, in each case where the weld extends through an unexposed or hidden wall, a multiple seal is produced, and the number of seals will increase with the number of such walls as are welded through, whereby added assurance is given against the possibility of vapor escaping between the walls of the seam, from the drum. In the seam of Figures 1 to 3 inclusive, a double seal is formed in each case, as is also the case in connection with the embodiment of Figure 7. Where the walls of a crimped joint of the type of Figures 4 to 7 inclusive, are all joined in a common weld, a total of four complete and independent seals are formed, and in order for liquid or vapor to leak through the seam, such liquid or vapor must pass through each seal in succession. Inasmuch as one weld seal, if properly formed, will preclude leakage of liquid or vapor, the successive seals offer a safeguard against a porous or improperly formed seal, at the same time reinforcing and strengthening the seam as to enable it to withstand the abuse to which seams are normally exposed in use.

In every case where the outer wall on the inner side of the seam, such as the wall 18 of Figures 1 to 3 inclusive, and the wall 28 of Figures 4 to 7 inclusive, is welded to the adjacent wall, which is the case in the embodiments of Figures 1 to 4 inclusive, 6 and 7, the ability of the drum to withstand internal hydrostatic or vapor pressures is greatly enhanced. The remainder of the seam, as a result, is not exposed to such forces to anywhere near the same degree as in conventional seam structures of the prior art.

The sheet material from which drums of the prior art are made, and particularly the well known conventional type employing a cemented crimped seam, is of heavier gauge than necessary for minimum safe wall thickness. This is so, because the seam which is the weakest part of the drum, requires this heavy gauge metal, to satisfactorily withstand the abuse to which drums are normally subjected.

The seam formed in accordance with my present invention is of such solidity and ruggedness, by reason of the novel method employed in welding through the walls thereof, that the seam may be formed of material of lighter gauge than formerly thought possible, thus allowing the drum itself to be fabricated from material of a lighter gauge, which will be more in keeping with the wall stresses encountered in the use of such drums. This in itself offers two obvious and important advantages. First, it effects a decided saving in drum material, and to that extent, lowers the cost thereof. Secondly, it lowers the weight of the drum, thus effecting further economies in the shipping thereof.

It will, therefore, be apparent that in producing the novel and improved seam of my invention, I not only realize a more efficient seam structure, but I am thereby enabled to effect considerable economies both in the manufacture of the drum and in the handling of the finished device.

My invention is primarily adapted to drums of the black metal type, that is drums having no galvanizing on the surfaces thereof, although with due care, it is probable that the embodiment of Figure 5 might be successfully adapted to drums having interior galvanized surfaces. Such drums, when designed for the handling and shipping of highly volatile and explosive fluids, are usually of rather heavy gauge metal, and I have found that, regardless of how heavy such material may be, I can utilize the method of the present invention to form a multiple seal seam which inherently becomes heavily reinforced, to withstand the abuse of handling and shipping of such drums.

While I have disclosed my invention in connection with the formation of a chime seam, it is also applicable in the formation of a lap seam, such as may be provided in forming the cylindrical wall of a drum by overlapping the longitudinal edge portions of the wall sheet and welding through the exposed edge portion and into the covered edge portion.

Although I have described in detail a few embodiments of my invention, now that I have disclosed the same, various additional modifications may occur to those skilled in the art. I, therefore, do not desire to be limited in my protection to such disclosures, except as may be necessitated by the appended claims.

I claim:

1. The method of forming a seam in a metal drum, which comprises bringing the peripheral portion of a head sheet adjacent the peripheral portion of a wall sheet, folding one of said peripheral portions about the other to provide a chime seam of more than two parallel seam walls, welding all of said seam walls together along an intermediate portion thereof and along a path extending the entire periphery of said seam, simultaneously adding molten metal to the outer periphery of said chime seam along the path of said weld to form a continuous radially projecting reinforcing bead around said chime seam and extending on either side of said weld, and cooling said molten metal to shrink said bead.

2. A chime seam in a metal drum, comprising a plurality of seam walls, including peripheral portions of both a head sheet and a wall sheet, said walls being joined along intermediate portions thereof into a unitary metallic bond by the use of additional metal and welding, said weld and additional metal forming a continuous peripheral bond with the additional metal projecting radially outwardly of the chime seam and forming a continuous bead about said chime seam, said bead upon cooling shrinking said seam.

ARCHIE W. McCLARY.